United States Patent Office 3,738,967
Patented June 12, 1973

3,738,967
POLYAMIDES FROM BIS-MALEIMIDES AND H₂S
James V. Crivello, Mechanicville, N.Y., assignor to General Electric Company, Schenectady, N.Y.
No Drawing. Filed July 16, 1971, Ser. No. 163,408
Int. Cl. C08g 20/20
U.S. Cl. 260—78 UA          12 Claims

ABSTRACT OF THE DISCLOSURE

Polyimide compositions are obtained by the reaction of a bis-imide and hydrogen sulfide. The resulting polymeric compositions have physical properties which make them suitable in coating, insulating, and molding applications.

---

This invention is concerned with polyimide compositions. More particularly, the invention relates to a polymer composed of recurring structural units of the formula

I

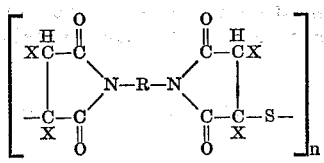

where X is a member selected from the class consisting of hydrogen and the methyl radical, R is a divalent organic radical selected from the class consisting of divalent hydrocarbon radicals of from 1 to 40 carbon atoms and divalent groups consisting of two aryl residues attached to each other through the medium of a member selected from the class consisting of an alkylene radical of from 1 to 10 carbon atoms,

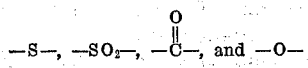

$n$ is a whole number in excess of 1, for instance, 2 to 10,000 or more.

The invention also includes methods for making polymeric compositions of Formula I by effecting reaction between a bis-maleimide of the general formula

II

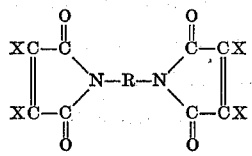

with hydrogen sulfide in the presence of a proton donor, advantageously in the presence of a solvent for one or both of the reactants and for the reaction product, where X and R have the meanings given above. The above-identified compositions of Formula I can also be made by forming an aqueous emulsion of the bis-imide and thereafter interacting the latter with the hydrogen sulfide.

When bis-maleimides of Formula II are reacted with hydrogen sulfide, one obtains a gelled, substantially infusible and insoluble mass. This resulting product has little if any commercial utility. Unexpectedly, I have discovered that when a bis-maleimide of Formula II is reacted with hydrogen sulfide, in the presence of a proton donor (i.e. in the presence of an acidic hydrogen ion), the reaction between the bis-malemide and hydrogen sulfide proceeds smoothly to give soluble, fusible polymers.

The term "proton (H+) donor" is intended to mean any compound, whether organic or inorganic, capable of ionizing to give a proton and includes, for instance, inorganic acids (e.g., HCl, HClO₄, H₃PO₄, H₂SO₄, etc.); organic carboxylic acids (e.g., formic acid, acetic acid, propionic acid, benzoic acid, isobutyric acid, trifluoroacetic acid, maleic acid, etc.); organic compounds containing weakly acidic hydrogen atoms in the form of nuclearly bonded hydroxyl groups (e.g., phenol and substituted phenols, including mesitol, cresol, xylenol, hydroquinone, etc.); acidic inorganic and organic salts (e.g., ammonium chloride, trialkyl ammonium salts, for instance, tributyl ammonium chloride, etc.); etc.

The amount of the proton donor can be varied widely. Generally, it is present in an amount sufficient to suppress the competing anionic polymerization leading to the gel stage. Based on the weight of the bis-maleimide, the proton donor may range from 0.5 to 10%, by weight, or more. If desired, the acidic proton donor can be present in larger amounts so as also to act as the reaction medium, for instance, in connection with the use of materials such as acetic acid, cresol, etc.

The bis-imides of Formula II may be prepared by effecting reaction between a diamino compound of the formula

III          $NH_2-R-NH_2$ and an anhydride of the general formula

IV

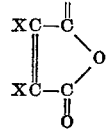

where R and X have the meanings given above. In practice, the compositions of Formula II may be obtained by effecting reaction in a well-known fashion between 2 mols of the anhydride of Formula IV and the diamino compound of Formula III. Among the anhydrides of Formula IV which may be employed are, for instance, maleic anhydride, citraconic anhydride, and dimethyl maleic anhydride (pyrocinchonic anhydride).

The bis-imides of the general Formula II can be varied widely depending on the kinds of organic radicals which are present therein. Among the divalent groupings which R may broadly and more specifically represent are, for instance, divalent saturated alkylene radicals of up to 40 carbon atoms, for instance, 1 to 10 (e.g., ethylene, propylene, butylene, isopropylidene, hexylene, cyclohexylene, etc.), the divalent radical of diethylene oxide of the formula —CH₂—CH₂—O—CH₂—CH₂— etc.); arylene including various isomers thereof (e.g., m-phenylene, p-phenylene, p,p'-biphenylene, m,m'-biphenylene, dichlorophenylene, biphenylene methylene of the formula

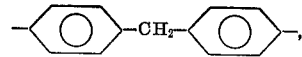

biphenylene oxide, biphenylene sulfone, biphenylene sulfide, keto biphenylene of the formula

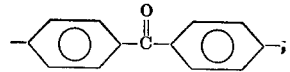

etc. Obviously, the arylene radicals may be attached to nitrogens through the ortho, meta or para positions.

Typical examples of the bis-imides of Formula II which may be treated with the H₂S are, for instance, N,N'-ethylene - bis - maleimide, N,N'-m-phenylene-bis-maleimide, N,N' - p - phenylene - bis - maleimide, N,N'-hexamethylene - bis - maleimide, N,N' - p,p' - diphenylmethane-bis-maleimide (hereafter referred to as "BMI"), N,N' - p,p' - diphenylether - bis - maleimide, N,N'-p,p' - diphenylthioether - bis-maleimide, N,N' - p,p'-diphenylsulfone - bis - maleimide, N,N' - 4,4 - dicyclohexylmethane - bis - maleimide, N,N'-m-xylylene - bis-maleimide, N,N' - p,p' - benzophenone - bis - maleimide, N,N' - (3,3' - dichloro-p,p'-biphenylene) bis-maleimide, N,N' - p,p' - diphenylmethane - bis - (methylmaleimide);

N,N' - p,p' - diphenylmethane - bis - (dimethylmaleimide) which can be made from pyrocinchonic anhydride and 4,4'-diaminodiphenyl methane, etc. Halogenated derivatives of such bis-imides where halogen is on an aryl nucleus can also be employed without departing from the scope of the invention, e.g., N,N'-(3,3' - dichloro-4,4'-biphenyloxy) - bis - maleimide, N,N' - (3,3' - dibromo-4,4' - diphenylmethane) bis-maleimide, etc. Mixtures of the bis-imides can also be used if desired.

The above bis-imides of Formula II can be prepared by reacting two mols of maleic anhydride (or other methyl-substituted maleic anhydride required for making the bis-imides of Formula II) with one mole of a suitable diamino compound. Mixtures of anhydrides can be used if desired. Typical of the diamino compound which may be employed for making the bis-imides of Formula II may be mentioned, for instance, meta-phenylene diamine; paraphenylene diamine; 4,4' - diamino - 3,5,3',5'-tetramethyldiphenyl methane, 4,4' - diamino - diphenyl propane; 4,4' - diamino - diphenyl methane; 4,4'-diamino-diphenyl sulfide; 4,4' - diamino - diphenyl sulfone; 3,3'-diamino-diphenyl sulfone; 4,4' - diamino-diphenyl ether; 4,4' - diamino - 3,5,3',5' - tetrachloro - diphenyl methane, 1,5-diamino-naphthalene; 3,3' - dimethyl - 4,4' - diamino-biphenyl; 3,3' - dimethoxy benzidine; 2,4 - bis - (beta-amino-t-butyl) toluene; bis - 4,4' - (beta-amino-t-butylphenyl) ether; para-bis(2 - methyl - 4 - amino-pentyl) benzene; para - bis - (1,1 - dimethyl - 5 - amino-pentyl) benzene; α,α'-diamino-m-xylylene; α,α' - diamino-p-xylylene; bis(4 - amino-amino-cyclohexyl) methane; hexamethylene diamine; heptamethylene diamine; octamethylene diamine; nonamethylene diamine; decamethylene diamine; 3-methylheptamethylene diamine; 4,4-dimethylheptamethylene diamine; 2,11 - diamino-dodecane; 1,2-bis-(3 - amino-propoxy) ethane; 2,2 - dimethyl propylene diamine; 3-methoxyhexamethylene diamine; 2,5-dimethylhexamethylene diamine; 2,5 - dimethylheptamethylene diamine; 5 - methylnonamethylene diamine; 1,4-diamino-cyclohexane; 1,12 - diamino-octadecane; and mixtures thereof.

The reaction of the hydrogen sulfide and the bis-imide (or mixtures of bis-imides) may be carried out by merely mixing the ingredients together at room temperature and permitting the reaction to proceed whereby the exothermic heat of reaction may increase the temperature up to 40 to 50° C. Heating in the range of about 50 to 150–200° C. for a length of time required to obtain the desired polymer can also be used if it is desired to accelerate the reaction. Generally, temperatures on the order of about 50° to 150° C. are adequate for the purpose.

Ordinarily, it is desirable to effect reaction between the bis-imide and the hydrogen sulfide in the presence of a solvent which is inert to the reactants and the reaction product and yet is a solvent for at least one of the reactants and certainly for the reaction product. Typical of such solvents which may be employed for the purpose are benzene, xylene, chlorobenzene, trichlorobenzene, cresol (including mixtures of cresols), N-methyl-2-pyrrolidone, dimethyl formamide, etc. The choice of solvent is not critical and any one which satisfies the above conditions of inertness and solvation can be advantageously used. On a weight basis, the solvent may comprise from 1 to 50 or more parts of the solvent per part of the reactant or reactants. Generally, it is advisable to dissolve the bis-imide in a suitable solvent and then pass hydrogen sulfide gas into the solution.

Although the reaction between the bis-imide and hydrogen sulfide proceeds fairly well under most conditions, I have found that the incorporation of certain catalyst materials markedly improves the rate of reaction and the time in which optimum yields are obtained. Among such catalysts which may be mentioned are, for instance, tertiary amines, for example, triethyl amine, tri-n-butyl amine, etc. Other catalysts which have been found useful particularly when employing a two-phase emulsion system (in which the monomer is dissolved in a solvent, such as cresol, and the catalyst is dissolved in water and the total mixture emulsified with emulsifying agents such as carboxy methyl cellulose) include sodium carbonate, potassium carbonate, sodium bicarbonate, etc. Generally, when polar solvents such as dimethylformamide, N-methyl-2-pyrrolidone, dimethyl sulfoxide, etc., are employed, catalysts are normally not needed to effect the desired reaction.

The amount of catalysts used can vary widely. Generally, no more should be employed than is necessary to effect optimum completion of the reaction. Ordinarily, no more than 0.01%, by weight, of the catalyst, based on the weight of the bis-imide is required, and usually amounts of the order of 0.0001% to 0.001% by weight, of the catalyst, based on the weight of the bis-imide, are sufficient.

The amount of hydrogen sulfide used should be at least equal in molar concentration to the mols of bis-imide employed. Thus, for higher molecular weight products, there should be employed at least 1 mol, preferably more than 1 mol (to insure completion of the reaction), e.g., up to 5 to 10 mols of the hydrogen sulfide per mol of the bis-imide. The rate of passage of $H_2S$ is not critical and can be varied widely. Generally, from 0.1 to 1 mol $H_2S$ per hour per mol bis-maleimide is satisfactory.

After obtaining the polymer which may require reaction for times ranging from about 5 minutes to 2–3 hours or more, the solution of the polymer is treated with a non-solvent such as water or a lower alkanol, such as methanol, to precipitate the polymer and the polymer can then be isolated in well-known manners and used for whatever purpose intended. In addition to being soluble in many solvents referred to above, particularly the cresols, these polymers are usually soluble in other solvents such as dimethylformamide, dimethylsulfoxide, etc. The fact that such polymers are soluble in cresol makes them advantageously useful as coating compositions for electrical conductors whereby the conductor can be passed through the cresol solution of the polymer and the solvent is driven off by heat and the polymer on the conductor core cured at elevated temperatures of the order of about 150–300° C. for times varying from 5 minutes to 1 hour. The polymers obtained in this fashion are usually infusible and insoluble.

In addition to the use of heat alone, the acceleration of the polymers to the thermoset, i.e., the infusible and insoluble state, can be accelerated by the employment of small amounts of organic peroxides or other free radical producing agents normally used to accelerate polymerization. Among such organic peroxides may be mentioned, dicumyl peroxide, benzoyl peroxide, tertiary butyl perbenzoate, tertiary butyl hydroperoxide, azo-bis-isobutyronitrile, etc. Generally the amount of cure accelerator employed for the purpose can range from about 0.01 to as high as 5 percent or more, by weight, based on the weight of the polymer.

In addition to the foregoing mixture of ingredients, it is possible to blend the polymer of Formula I with other polymers and resins in amounts ranging from about 1 to 75 percent or more, by weight, of the polymer based on the total weight of the polymer of Formula I and the other polymeric ingredient. Included among such polymers may be mentioned polyolefins (e.g., polyethylene, polypropylene, etc.) polystyrene, polyphenylene oxides such as shown in U.S. 3,306,875, epoxy resins such as shown in U.S. 2,840,540, polycarbonate resins such as shown in U.S. 3,028,365, silicon resins such as shown in U.S. 2,258,218–222, phenol-aldehyde resins, polyimide resins such as shown in U.S. 3,179,633–634, polyarylene polyethers such as shown in U.S. 3,332,909, etc., many of which are well-known and well-documented in the art.

In order that those skilled in the art may better understand how the present invention may be practiced, the following examples are given by way of illustration and not by way of limitation. All parts are by weight unless otherwise stated.

The intrinsic viscosities recited in the following examples were measured in dimethylformamide at 25° C. The cut-through tests recited in these examples were carried out in the manner described in U.S. Pat. 2,936,296 issued May 10, 1960, and assigned to the same assignee as the present invention.

Unless otherwise stated the polymers were generally prepared by passing hydrogen sulfide gas through a solution of the requisite bis-imide for about one hour at an even rate of approximately 1 liter per hour of hydrogen sulfide during this period. Unless otherwise stated, films made from the polymers prepared in the following examples were deposited from solutions of the polymer in dimethylformamide (DMF) whereby the DMF was removed by heating at temperatures in the order of about 100–150° C.

EXAMPLE 1

Into a reaction vessel equipped with a stirrer, reflux condenser, thermometer and gas inlet tube, were placed 10 grams (0.0279 mol) of BMI, 90 ml. dimethylformamide, and 50 ml. acetic acid (as the proton donor). Hydrogen sulfide gas was slowly admitted into the reaction mixture. During the first 10 minutes of time, the viscosity and temperature of the reaction mixture rose to a maximum of about 36° C. At this point, the hydrogen sulfide addition was terminated and stirring of the reaction mixture continued for about 1 hour after which the reaction mixture became quite viscous. The mixture was then combined with methanol to precipitate the polymer and after washing the polymer again with methanol, there was obtained 10.6 grams of polymer having an intrinsic viscosity of 0.53 dl./gram. This polymer was composed of recurring structural units of the formula V
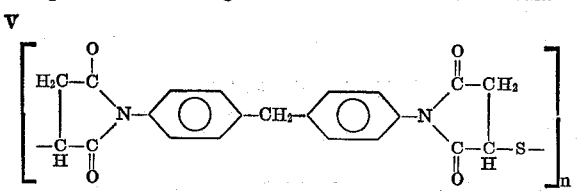

where $n$ is a whole number in excess of 1.

EXAMPLE 2

Employing the same procedure as in Example 1, 10 grams of BMI were dissolved in 50 ml. distilled cresol. About 2 drops of tetramethylethylene diamine was added as a catalyst to accelerate the reaction after which hydrogen sulfide was added at a slow rate of about 1 liter per hour. A rapid increase in viscosity was accompanied by a rise of the reaction temperature from 20° C. to about 37° C. After one hour, the reaction mixture became extremely viscous. The polymer was isolated by pouring the reaction mixture into methanol acidified with hydrochloric acid. Filtration yielded a polymer which was extracted with hot ethanol to remove any remaining traces of cresol, filtered again and dried in an air oven. This yielded a polymer composed of the recurring structural units of the formula V having an intrinsic viscosity of 0.40 dl./gram.

EXAMPLE 3

A polymer was prepared similarly as in Example 2 with the exception that 5 grams of bis-maleimide-4,4′-diaminodiphenyl ether was used in place of the BMI of Example 2. A quantitative yield of a white powder was obtained having an intrinsic viscosity of 0.43 dl./gram.

EXAMPLE 4

Employing the procedure recited in Example 2, N,N′-p,p′-biphenylene-bis-malemide dissolved in DMF was treated with hydrogen sulfide to give a polymer having an intrinsic viscosity of 0.31 dl./gram and a softening point in excess of 300° C. This polymer was composed of recurring structural units of the formula VI
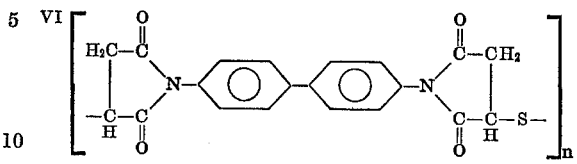

where $n$ is a whole number in excess of 1. Analysis of the polymer showed the following results:

Found (percent): C, 63.2; H, 3.7; N, 7.3. Calculated (percent): C, 63.49; H, 3.70; N, 7.40.

EXAMPLE 5

Employing the same procedure as in Example 2, N,N′-α,α′-naphthyl-bismaleimide having the formula VII
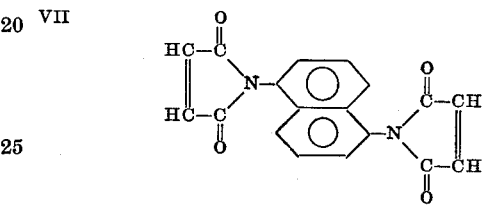

was dissolved in DMF and hydrogen sulfide passed through the solution to obtain a polymer having an intrinsic viscosity of 0.29 dl./gram and a softening point of 297–300° C. This polymer was composed of recurring structural units of the formula VIII
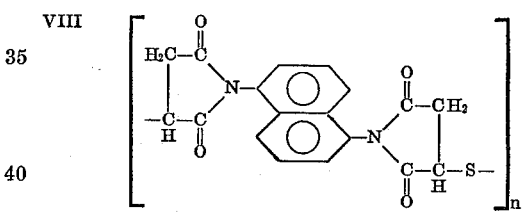

where $n$ is a whole number in excess of 1.

EXAMPLE 6

When N,N′ - p,p′ - diphenylmethane-bis-(methyl-maleimide) is substituted for the BMI of Example 2, and hydrogen sulfide is passed into the solution of the former bis-maleimide, one obtains a polymer having good physical properties and heat resistance which can be used for coating or insulating purposes. The polymer thus obtained is composed of recurring structural units of the formula IX
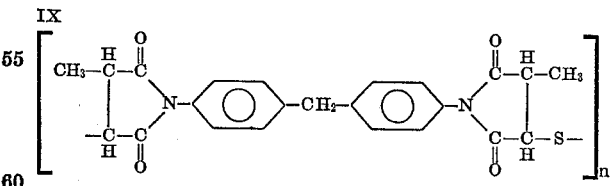

where $n$ is a whole number greater than 1.

EXAMPLE 7

When N,N′-p,p′ - diphenylethane - bis - (dimethylmaleimide) is substituted for the BMI of Example 2, a polymer having good physical properties is obtained composed of recurring structural units of the formula X
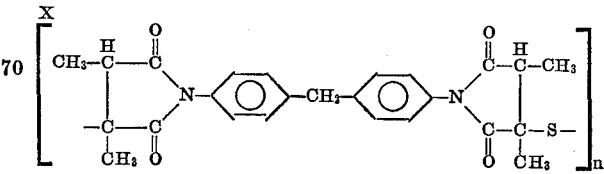

where $n$ is a whole number in excess of 1.

EXAMPLE 8

When N,N'-p,p'-phenylene-bis-maleimide was substituted for the BMI of Example 2 and hydrogen sulfide was passed into the solution of the former bis-maleimide, there was obtained a white polymer having an intrinsic viscosity of 0.33 dl./gram and composed of recurring structural units of the formula XI 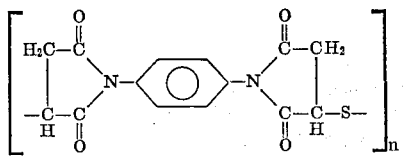

where n is a whole number in excess of 1. The identity of this product was identified by the following analyses:

Found (percent): C, 55.3; H, 3.46; N, 9.37. Calculated (percent): C, 55.62; H, 3.31; N, 9.27.

EXAMPLE 9

Employing the same equipment and procedure similarly as in Example 2, 5 grams (0.0186 mol) 1,3-phenylene bismaleimide, 50 ml. distilled cresol and 2 drops tetramethylethylene diamine were mixed together and hydrogen sulfide mixed with nitrogen (approximately in a 1 to 5 volume ratio) was slowly passed through the reaction mixture. After 2 hours of addition, the resulting polymer solution was poured into enough methanol containing a small amount of HCl to precipitate the polymer. The polymer was removed by filtration, extracted with hot ethanol and dried. A quantitative yield of polymer composed of recurring structural units of the formula XII 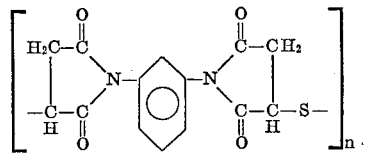

was obtained where n is a whole number in excess of 1. This polymer had an intrinsic viscosity of 0.11 dl./gram.

EXAMPLE 10

Employing the same conditions as in Example 1, 5 grams (0.0242 mol) N,N'-methylene bismaleimide was condensed with hydrogen sulfide. During the reaction, the temperature rose from 25° C. to 38° C. After the usual work up, 5.8 grams (approximately 100% yield) of white polymer was obtained having an intrinsic viscosity of 0.35 dl./gram. This polymer was composed of recurring structural units of the formula XIII 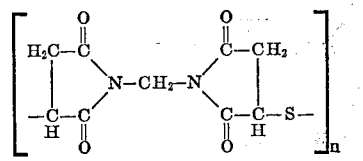

where n is a whole number in excess of 1, Evidence of this was established by the analyses which were as follows:

Found (percent): C, 45.23; H, 3.38; N, 10.74; S, 12.5. Calculated (percent): C, 45.00; H, 3.33; N, 11.66; S, 13.33.

EXAMPLE 11

Employing the same procedure described in Example 2, 5 grams (0.0139 mol) BMI, 5 grams (0.0138 mol) N,N'-bismaleimido-4,4'-diphenyl ether, 50 ml. cresol and 5 drops of tri-n-butylamine were mixed together and hydrogen sulfide was slowly admitted into the reaction mixture for about 1 hour until the entire mixture became highly viscous. The viscous mixture was poured into methanol to precipitate the polymer and after filtering the polymer and drying, a yield of 10.7 grams of the polymer (about 97.7% of theoretical) was obtained having an intrinsic viscosity of 0.38 dl./gram. This polymer was composed of recurring structural units of Formula V and units having the general formula XIV 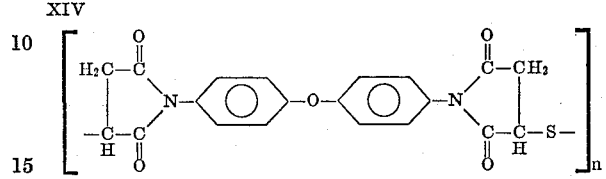

where n is a whole number greater than 1.

EXAMPLE 12

Employing the conditions of reaction in Example 2, 7.16 grams (0.02 mol) BMI and 5.36 grams (0.02 mol) 1,4-phenylene bismaleimide together with 2 drops tetramethylethylene diamine were dissolved in 100 ml. distilled cresol. Hydrogen sulfide diluted with nitrogen was bubbled slowly into the reaction mixture for a period of about 2 hours until the solution became very viscous. The polymer was precipitated by pouring it into an acidified methanol and the precipitated polymer was removed by filtration, extracted with ethanol and after the ethanol was cooled, the precipitated polymer was removed and dried. A quantitative yield of a light colored polymer composed of recurring structural units of Formulas V and XI was obtained. This polymer had an intrinsic viscosity of 0.33 dl./gram. That the polymer was in fact obtained was established by the analyses which were as follows:

Found (percent): C, 59.9; H, 3.74; N, 7.94; S, 8.6. Calculated (percent): C, 60.51; H, 3.74; N, 8.06; S, 9.22.

The polymers of Formula I can be treated by suitable means to form other polymers containing a sulfone linkage. Thus the polymer of Formula I can be dissolved in a suitable solvent, for instance, benzene, toluene, acetic acid, etc. and thereafter treated with an oxidizing agent employing a sufficient amount of the oxidizing agent to convert each sulfur in the recurring unit of Formula I to the sulfone (—$SO_2$—) grouping. Such polymers will have the general formula XV 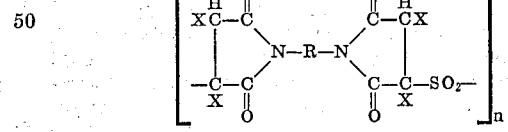

where X, R and n have the meanings given above.

The oxidation reaction is generally conducted by heating the mixture of the polymer of Formula I with the oxidizing agent for a period of time and at a temperature (for example, from 1 to 5 hours at a temperature of from 50° to 100° C.) until the desired polymer is obtained. The polymer can then be worked up and isolated in the same manner as was done in connection with the preparation and isolation of the other sulfur polymers of Formula I.

A typical example whereby a sulfone polymer of Formula XV was obtained is shown by the following.

About 5 grams of the polysulfide polymer of Formula V derived and prepared in accordance wtih Example 1 was placed in a reaction vessel equipped with a stirrer. Thereafter, 30 ml. glacial acetic acid was added and then 10 ml. of 30% hydrogen peroxide. The reaction mixture was stirred and heated at 60–65° for about 3 hours. The white polymeric product which was obtained was removed by filtration and dried to give 5.1 grams of a polysulfone polymer composed of recurring structural units of the formula

XVI

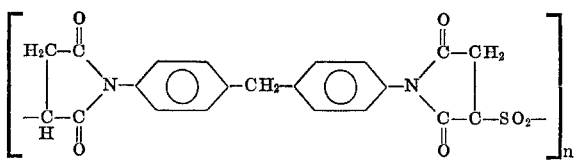

where $n$ is a whole number in excess of 1. This resin had a softening point of 278–284° C. The structure for the polymer was established by NMR and analytical data as well as by the following analyses:

Found (percent: C, 58.8; H, 3.8; N, 6.7. Calculated (percent): C, 59.4; H, 3.77; N, 6.60.

The crosslinking of a polysulfide polymer as previously described was accomplished as follows. The polysulfide polymer of Formula V prepared in accordance with Example 1 was milled with 2%, by weight, thereof of dicumyl peroxide and thereafter molded under heat and pressure for about 15 minutes at 290° C. Whereas before molding the polymer was fusible and soluble, after molding, it was infusible and insoluble in most solvents attesting to the fact that it had become crosslinked.

As pointed out previously, the reaction between the bismaleimide and the hydrogen sulfide may be carried out in an emulsion medium. Typically, such an emulsion medium will comprise the bis-maleimide, advantageously a catalyst, a proton donor, a solvent (especially one which can also act as a proton donor), and a sufficient amount of water to make the emulsion sufficiently fluid to permit reaction between the bis-maleimide and the hydrogen sulfide and still allow the formed polymer to be readily dispersed in the emulsion as it is formed. Usual emulsifying agents, such as carboxymethyl hydroxyethyl cellulose, can be employed for forming the emulsion.

Polymers obtained by this emulsion method tend to have higher molecular weights and higher intrinsic viscosities. Problems concerned with the viscosity of the reaction medium are usually avoided since the polymer is in the form of suspended, very fine particles in a non-viscous medium. The polymer obtained from the emulsion method precipitates as a fine, nearly white powder which is easily washed and dried. Emulsions of the polymers are stable for long periods of time and can be employed for many applications in this physical state.

The following examples illustrate methods for carrying out the reaction in emulsion form.

EXAMPLE 13

To a reaction vessel fitted with a stirrer, hydrogen sulfide inlet and thermometer were added 30 ml. cresol, 40 ml. water, 5 grams of BMI, 1 drop tri-n-butylamine and 2 ml. of a solution prepared by dissolving 0.5 gram carboxymethyl hydroxyethyl cellulose in 25 ml. water. The mixture was vigorously agitated to form a stable emulsion. Thereafter, hydrogen sulfide was slowly added to the reaction mixture for a period of about 1 hour, at the end of which time an emulsion containing the polymer dispersed therein was obtained. When the polymer emulsion was poured into methanol, a light colored free-flowing powder was obtained. This powder was washed and dried to give a resinous composition in a yield of about 5.3 grams having an intrinsic viscosity of 0.63 dl./gram and being composed of recurring structural units of Formula V.

EXAMPLE 14

The reaction described in Example 13 was repeated in all details with the exception that the tri-n-butylamine was replaced by 1 gram sodium bicarbonate. After the reaction was carried out and the polymer worked up, a resinous composition was obtained having an intrinsic viscosity of 0.45 dl./gram.

The compositions of the present invention have application in a wide variety of physical shapes and form, including the use as films, molding compounds, coatings, etc. When used as films or when made into molded products, these polymers, including laminated products prepared therefrom, not only possess good physical properties at room temperature but they retain their strength and excellent response to work-loading at elevated temperatures for long periods of time. Films formed from the polymeric compositions of this invention may be used in applications where films have been used previously. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for containers and container linings; in laminating structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures. Films made from these compositions of matter can also serve in printed circuit applications.

Alternatively, solutions of the compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the curable compositions of the present invention as overcoats on other types of insulation is not precluded.

Applications which recommend these resins include their use as binders for asbestos fibers, carbon fibers, and other fibrous materials in making brakelinings. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well known in the art. In addition, various heat-resistant pigments and dyes may be incorporated as well as various types of inhibitors depending on the application intended.

The compositions herein defined may suitably be incorporated in other materials to modify the properties of the latter or in turn their properties may be modified by the incorporation of the other material. For example, they may be compounded with substances such as natural or synthetic rubbers; synthetic resins such as phenolaldehyde resins, urea-aldehyde resins, alkyd resins, etc.; cellulosic material such as paper, inorganic and organic esters of cellulose such as cellulose acetate, cellulose ether; such as methyl cellulose, ethyl cellulose, benzyl cellulose, etc. In some instances, plasticizers and other modifying agents may be used in combination therewith to yield products which when applied to a base member and air dried or baked have a high degree of heat-resistance due to the presence of the compositions herein defined.

It will of course be apparent to those skilled in the art that in addition to the compositions specifically referred to in the foregoing examples, other bis-imides of Formula II, solvents, catalysts, proton donors, etc., many examples of which have been described above, may be employed without departing from the scope of the invention. The processing techniques may be varied widely employing the many conditions recited previously.

What I claim as new and desire to secure by Letters Patent of the United States is:

1. A film-forming or moldable composition of matter composed of recurring structural units of the formula $$\left[\begin{array}{c} \text{XC-C} \\ \text{H} \\ -\text{C-C} \\ \text{X} \\ \text{O} \end{array} \text{N-R-N} \begin{array}{c} \text{C-CX} \\ \text{H} \\ \text{C-C-S-} \\ \text{O} \text{ X} \end{array}\right]_n$$

where X is a member selected from the class consisting of hydrogen and the methyl radical, R is a divalent organic radical selected from the class consisting of divalent hydrocarbon radicals of from 1 to 40 carbon atoms and divalent groups consisting of two aryl residues attached to each other through the medium of a member selected from the class consisting of an alkylene radical of from 1 to 10 carbon atoms, —S—, —SO$_2$—, $$-\overset{\text{O}}{\underset{\|}{\text{C}}}-$$

and —O—, and $n$ is a whole number in excess of 1.

2. A film-forming or moldable polymer composed of recurring structural units of the formula $$\left[\begin{array}{c} \text{H}_2\text{C-C} \\ -\text{C-C} \\ \text{H} \text{ O} \end{array} \text{N-}\bigcirc\text{-CH}_2\text{-}\bigcirc\text{-N} \begin{array}{c} \text{C-CH}_2 \\ \text{C-C-S-} \\ \text{O} \text{ H} \end{array}\right]_n$$

where $n$ is a whole number in excess of 1.

3. A film-forming or moldable polymer composed of recurring structural units of the formula $$\left[\begin{array}{c} \text{H}_2\text{C-C} \\ -\text{C-C} \\ \text{H} \text{ O} \end{array} \text{N-}\bigcirc\text{-}\bigcirc\text{-N} \begin{array}{c} \text{C-CH}_3 \\ \text{C-C-S-} \\ \text{O} \text{ H} \end{array}\right]_n$$

where $n$ is a whole number in excess of 1.

4. A film-forming or moldable polymer composed of recurring structural units of the formula $$\left[\begin{array}{c} \text{H}_2\text{C-C} \\ -\text{C-C} \\ \text{H} \text{ O} \end{array} \text{N-}\bigcirc\bigcirc\text{-N} \begin{array}{c} \text{C-CH}_3 \\ \text{C-C-S-} \\ \text{O} \text{ H} \end{array}\right]_n$$

where $n$ is a whole number greater than 1.

5. A film-forming or moldable polymer composed of recurring structural units of the formula $$\left[\begin{array}{c} \text{H}_2\text{C-C} \\ -\text{C-C} \\ \text{H} \text{ O} \end{array} \text{N-}\bigcirc\text{-N} \begin{array}{c} \text{C-CH}_3 \\ \text{C-C-S-} \\ \text{O} \text{ X} \end{array}\right]_n$$

where $n$ is a whole number in excess of 1.

6. The process for making film-forming or moldable polymers composed of recurring structural units of the formula $$\left[\begin{array}{c} \text{XC-C} \\ \text{H} \\ -\text{C-C} \\ \text{X} \text{ O} \end{array} \text{N-R-N} \begin{array}{c} \text{C-CX} \\ \text{H} \\ \text{C-C-S-} \\ \text{O} \text{ X} \end{array}\right]_n$$

which process comprises effecting reaction in the presence of a proton donor between a bis-maleimide compound of the general formula $$\begin{array}{c} \text{XC-C} \\ \text{XC-C} \\ \text{O} \end{array} \text{N-R-N} \begin{array}{c} \text{C-CX} \\ \text{C-CX} \\ \text{O} \end{array}$$

and hydrogen sulfide, where X is a member selected from the class consisting of hydrogen and the methyl radical, R is a divalent organic radical selected from the class consisting of divalent hydrocarbon radicals of from 1 to 40 carbon atoms and divalent groups consisting of two aryl residues attached to each other through the medium of a member selected from the class consisting of an alkylene radical of from 1 to 10 carbon atoms, —S—, —SO$_2$—, $$-\overset{\text{O}}{\underset{\|}{\text{C}}}-$$

and —O—, and n is a whole number in excess of 1, the proton donor being present in an amount equal to at least 0.5%, by weight, based on the weight of the above bis-maleimide.

7. The process as in claim 6 wherein the reaction is carried out in the presence of a catalyst for the reaction selected from the class consisting of triethyl amine, tri-n-butylamine, tetramethylethylenediamine, sodium carbonate, potassium carbonate, and sodium bicarbonate.

8. The process as in claim 6 wherein the bis-maleimide is N,N'-p,p'-dimethylmethane bis-malemide.

9. The process as in claim 6 wherein the bis-maleimide is N,N'-p,p'-diphenyl ether bis-maleimide.

10. The process as in claim 6 wherein the bis-maleimide is N,N'-m-phenylene-bis-maleimide.

11. The process as in claim 6 wherein the proton donor is cresol.

12. The process which comprises forming an aqueous emulsion of N,N'-p,p'diphenylmethane-bis-maleimide with cresol, and thereafter introducing hydrogen sulfide into the emulsion to form a film-forming or moldable polymer composed of the recurring structural units of the formula $$\left[\begin{array}{c} \text{H}_2\text{C-C} \\ -\text{C-C} \\ \text{H} \text{ O} \end{array} \text{N-}\bigcirc\text{-CH}_2\text{-}\bigcirc\text{-N} \begin{array}{c} \text{C-CH}_2 \\ \text{C-C-S-} \\ \text{O} \text{ H} \end{array}\right]_n$$

where $n$ is a whole number greater than 1.

References Cited

UNITED STATES PATENTS 2,971,944   2/1961   Chow et al. _____ 260—78 UA
3,533,996   10/1970  Grundschober et al.
                                          260—78 UA HAROLD D. ANDERSON, Primary Examiner U.S. Cl. X.R.

117—161 P; 260—29.2 N, 29.6 H, 29.6 F, 30.80 S, 32.6 N, 33.4 P, 47 LZ, 47 UA, 63 R, 827, 836, 841, 851, 857 R